(12) United States Patent
Casale

(10) Patent No.: US 11,310,994 B2
(45) Date of Patent: Apr. 26, 2022

(54) PORTABLE PET BOWL

(71) Applicant: WATERSPOT, LIMITED, Cortland, OH (US)

(72) Inventor: Susan P. Casale, Cortland, OH (US)

(73) Assignee: WATERSPOT, LIMITED, Cortland, OH (US)

( * ) Notice: Subject to any disclaimer, the term of this patent is extended or adjusted under 35 U.S.C. 154(b) by 400 days.

(21) Appl. No.: 16/113,291

(22) Filed: Aug. 27, 2018

(65) Prior Publication Data
US 2019/0059321 A1 Feb. 28, 2019

Related U.S. Application Data

(60) Provisional application No. 62/550,736, filed on Aug. 28, 2017.

(51) Int. Cl.
*A01K 5/01* (2006.01)
*A01K 7/00* (2006.01)
*B65D 21/02* (2006.01)
*B65D 53/08* (2006.01)
*B65D 51/24* (2006.01)
*B65D 53/02* (2006.01)
(Continued)

(52) U.S. Cl.
CPC .......... *A01K 5/0135* (2013.01); *A01K 5/0121* (2013.01); *A01K 7/005* (2013.01); *B65D 21/0233* (2013.01); *B65D 43/0222* (2013.01); *B65D 43/165* (2013.01); *B65D 51/242* (2013.01); *B65D 53/02* (2013.01); *B65D 53/08* (2013.01); *B65D 2543/00092* (2013.01); *B65D 2543/00351* (2013.01); *B65D 2543/00546* (2013.01)

(58) Field of Classification Search
CPC .. B65D 21/0233; B65D 21/06; B65D 21/062; A01K 5/0135; A01K 5/0114; A01K 5/0107
USPC ...................................................... 119/51.5
See application file for complete search history.

(56) References Cited

U.S. PATENT DOCUMENTS 3,079,037 A * 2/1963 Schechter ............ B65D 43/021 220/212
3,246,786 A * 4/1966 Holley ............... B65D 43/0218 215/393
(Continued)

OTHER PUBLICATIONS

Pet-a-Bowl, Wags and Woofers; Prefilled Pet Bowl with a Removable Top and Adhesive Seal. https://www.wagsandwoofers.com/pages/pet-a-bowls-information-page, 2015.
(Continued)

*Primary Examiner* — Christopher D Hutchens
(74) *Attorney, Agent, or Firm* — Jacob M. Ward; Ward Law Office LLC

(57) ABSTRACT

A bowl assembly has a bowl and a lid. The bowl assembly is adapted to store water or food for a pet. The bowl functions as a container to hold the water or food, while the lid functions in a first configuration to seal the water or food within the bowl. The bowl assembly is convenient to travel with and adapted for use in a vehicle where in the first configuration. The bowl assembly allows for the pet to access the water or food while in a cup holder. The bowl assembly is also stabilized by the lid in a second configuration, where placed on a ground or floor surface.

9 Claims, 11 Drawing Sheets

(51) Int. Cl.
    *B65D 43/16*     (2006.01)
    *B65D 43/02*     (2006.01)

(56) References Cited

U.S. PATENT DOCUMENTS

| | | | | |
|---|---|---|---|---|
| 3,598,271 | A * | 8/1971 | Holley | B65D 51/249 |
| | | | | 215/227 |
| 4,047,329 | A * | 9/1977 | Holt | A01G 9/02 |
| | | | | 47/65.7 |
| D247,839 | S * | 5/1978 | Ashton | D7/507 |
| 4,600,253 | A | 7/1986 | Pongsengsook | |
| 4,938,373 | A * | 7/1990 | McKee | A47G 19/065 |
| | | | | 215/376 |
| 5,105,768 | A | 4/1992 | Johnson | |
| 5,150,804 | A * | 9/1992 | Blanchet | B65D 21/0223 |
| | | | | 206/505 |
| 5,209,184 | A | 5/1993 | Sharkan et al. | |
| 5,531,353 | A * | 7/1996 | Ward | A47G 19/2227 |
| | | | | 220/23.86 |
| 5,769,266 | A * | 6/1998 | Willbrandt | B65D 1/265 |
| | | | | 220/669 |
| 5,954,195 | A * | 9/1999 | Krueger | A47G 19/065 |
| | | | | 206/217 |
| 5,960,742 | A | 10/1999 | O'Rourke et al. | |
| 6,019,244 | A | 2/2000 | Jones | |
| 6,158,607 | A * | 12/2000 | Wallberg | B65D 43/0218 |
| | | | | 220/212 |
| 6,277,422 | B1 * | 8/2001 | Gale | B65D 51/24 |
| | | | | 220/212 |
| 6,425,480 | B1 * | 7/2002 | Krueger | A47G 19/065 |
| | | | | 206/217 |
| 6,886,694 | B2 * | 5/2005 | McNeeley | B65D 21/02 |
| | | | | 206/505 |
| 7,434,689 | B2 * | 10/2008 | Homann | B65D 81/361 |
| | | | | 206/509 |
| 7,490,577 | B2 | 2/2009 | Stephanos | |
| 7,527,017 | B1 | 5/2009 | Cribb | |
| 7,690,329 | B2 | 4/2010 | Parks | |
| 7,878,148 | B2 | 2/2011 | Swenson et al. | |
| D704,383 | S * | 5/2014 | Edlin | D30/121 |
| 8,777,043 | B2 * | 7/2014 | Furlong | B65D 21/0222 |
| | | | | 220/514 |
| 8,807,083 | B1 | 8/2014 | Ross | |
| 9,078,535 | B1 * | 7/2015 | Buck | A47G 19/2205 |
| 10,266,286 | B2 * | 4/2019 | Resh | B65D 77/2024 |
| D849,485 | S * | 5/2019 | Allen | D7/554.2 |
| 10,479,575 | B2 * | 11/2019 | Danenberg | A23K 40/30 |
| 2004/0056037 | A1 * | 3/2004 | Gluck | A47G 19/2227 |
| | | | | 220/625 |
| 2006/0186014 | A1 | 8/2006 | Ramanujam et al. | |
| 2006/0201055 | A1 | 9/2006 | Rowe et al. | |
| 2008/0290093 | A1 * | 11/2008 | Vadersen | B65D 51/225 |
| | | | | 220/359.2 |
| 2008/0302307 | A1 | 12/2008 | Bertsch et al. | |
| 2008/0314326 | A1 | 12/2008 | Albert | |
| 2009/0199776 | A1 | 8/2009 | Alexander et al. | |
| 2009/0283047 | A1 | 11/2009 | Swanson et al. | |
| 2010/0300363 | A1 | 12/2010 | Nangia | |
| 2011/0056438 | A1 * | 3/2011 | Edlin | A01K 7/00 |
| | | | | 119/72 |
| 2012/0228166 | A1 | 9/2012 | Mitchell | |
| 2013/0228544 | A1 | 9/2013 | Bennetti | |
| 2013/0248531 | A1 | 9/2013 | Lane | |
| 2016/0050884 | A1 | 2/2016 | Ross | |
| 2016/0176587 | A1 | 6/2016 | Plastique | |
| 2018/0370711 | A1 * | 12/2018 | Grove | B65D 21/0209 |
| 2019/0031397 | A1 * | 1/2019 | Grove | B65D 1/36 |

OTHER PUBLICATIONS

K9 Dog Bowls, K9 Travel Dog Bowls; Portable Dog Bowl Configured to Fit in a Cup Holder. http://k9traveldogbowls.com.
Highwave Dog Bowl, Highwave; Sqeezable Water Bottle Attached to a Bowl for a Pet to Drink From. https://www.highwave.com/products/auto-dog-mug-blk, 2017.

* cited by examiner

PORTABLE PET BOWL

CROSS REFERENCE TO RELATED APPLICATIONS

This application claims the benefit of U.S. Provisional Application Ser. No. 62/550,736, filed on Aug. 28, 2017. The entire disclosure of the above application is hereby incorporated herein by reference.

FIELD

The present disclosure relates to a container and, more specifically, to a portable pet bowl assembly.

BACKGROUND

Many people travel with their pets. However, there are few public places tailored to the needs of a pet owner. Restaurants and bar owners are often hesitant to lend bowls designated for human consumption to owners for their pets. Moreover, when traveling, there are few places that accommodate pets.

Pet bowls are well known in the art. To fulfill the pet's basic needs while traveling, the owner must often bring a portable pet bowl along with a separate bag or container filled with food or water to fill the bowl. For example, U.S. Patent App. Pub. No. 2009/0283047 to Swanson et al., teaches a pet bowl that holds water and is transportable.

Moreover, when the pet is traveling with an owner in a vehicle such as a car or plane, there is often no convenient place for resting the bowl. The owner is frequently left holding the bowl for the pet when the bowl is needed. Although there is minimal space to place a bowl in most vehicles, most modes of transportation have cup holders built into or disposed adjacent to the seats. Accordingly, a pet bowl configured to be placed within a cup holder would secure the bowl, while freeing up the hands of a user. One type of pet bowl designed to fit within cup holders is described in U.S. Pat. No. 7,527,017 to Cribb, which discloses an apparatus particularly adapted for use in automobiles.

However, pet bowls that are configured to be placed in a cup holder frequently have a base that is narrower than a portion of the bowl that holds the contents. This narrower base results in a bowl that is less stable when not disposed in the cup holder of the vehicle. These known bowls are particularly unstable and prone to tipping and spillage when used on ground surfaces or floors.

There is a continuing need for a pet bowl assembly that is convenient to travel with and adapted to for use in a vehicle. Desirably, the pet bowl assembly is also stable when placed on a ground or floor surface.

SUMMARY

In concordance with the instant disclosure, a pet bowl assembly that is convenient to travel with and adapted to for use in a vehicle, and which is also stable when placed on a ground or floor surface, has been surprisingly discovered.

In one embodiment, a bowl assembly includes a bowl and a lid. The bowl has a hollow main body with a first portion and a second portion. The first portion has a first wall with a lip that defines a first opening in the main body. The second portion has a second wall. The first portion has a minimum width and the second portion having a maximum width. The minimum width of the first portion is greater than the maximum width of the second portion. The lid also has a hollow receiver portion. The lid is positionable between a first configuration and a second configuration. The first configuration seals the first opening of the hollow main body and the second configuration supports the hollow main body.

In another embodiment, a stacked combination suitable for storage or commercial display includes a first bowl assembly and a second bowl assembly. Each of the first bowl assembly and the second bowl assembly contain a lid in the first configuration that seals first openings of the first and second bowl assemblies. The second portion of the first bowl assembly is disposed in a hollow receiver portion of the second bowl assembly in a nested arrangement. The first bowl assembly and the second bowl assembly may be prefilled with contents such as water or food where in the stacked combination.

In a further embodiment, a bowl assembly includes a bowl and a lid. The bowl has a hollow main body with a side wall and a base wall. The side wall has a lip that defines a first opening of the hollow main body. The base wall has a gripping layer that is configured to minimize slippage of the main body on a ground or floor surface, and to also militate against the main body scratching the ground or floor surface when in use by the pet. For example, the gripping layer may include a soft felt material. The lid is movable between a first configuration, where the first opening of the hollow main body is sealed, and a second configuration, where the first opening of the hollow main body is unsealed. At least one of the lip of the bowl and the lid is magnetic in order to magnetically secure the lid to the lip in the first configuration.

DRAWINGS

The above, as well as other advantages of the present invention, will become clear to those skilled in the art from the following detailed description of a preferred embodiment when considered in the light of the accompanying drawings in which.

Figure 1:
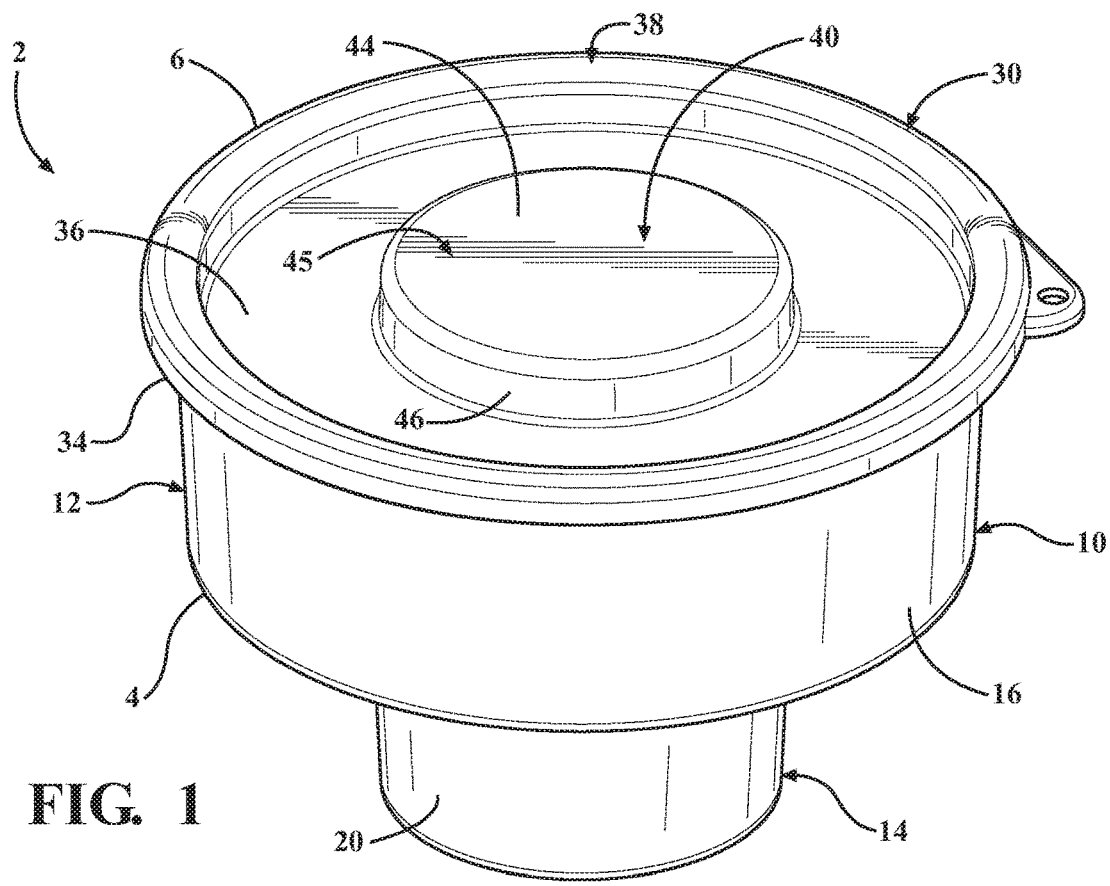
FIG. 1 is a top perspective view of a bowl assembly according to one embodiment of the present disclosure, the bowl assembly depicted with a lid and a bowl in a first configuration, with the lid disposed on a top of the bowl.
Figure 3:
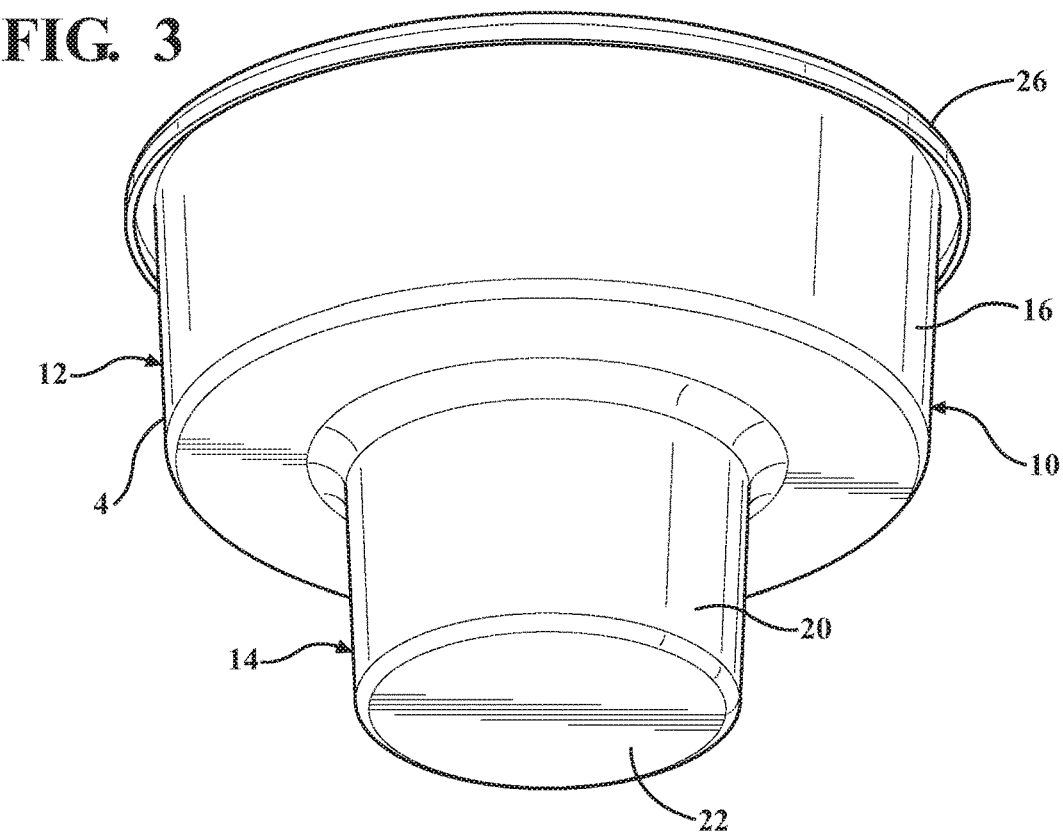
Figure 4:
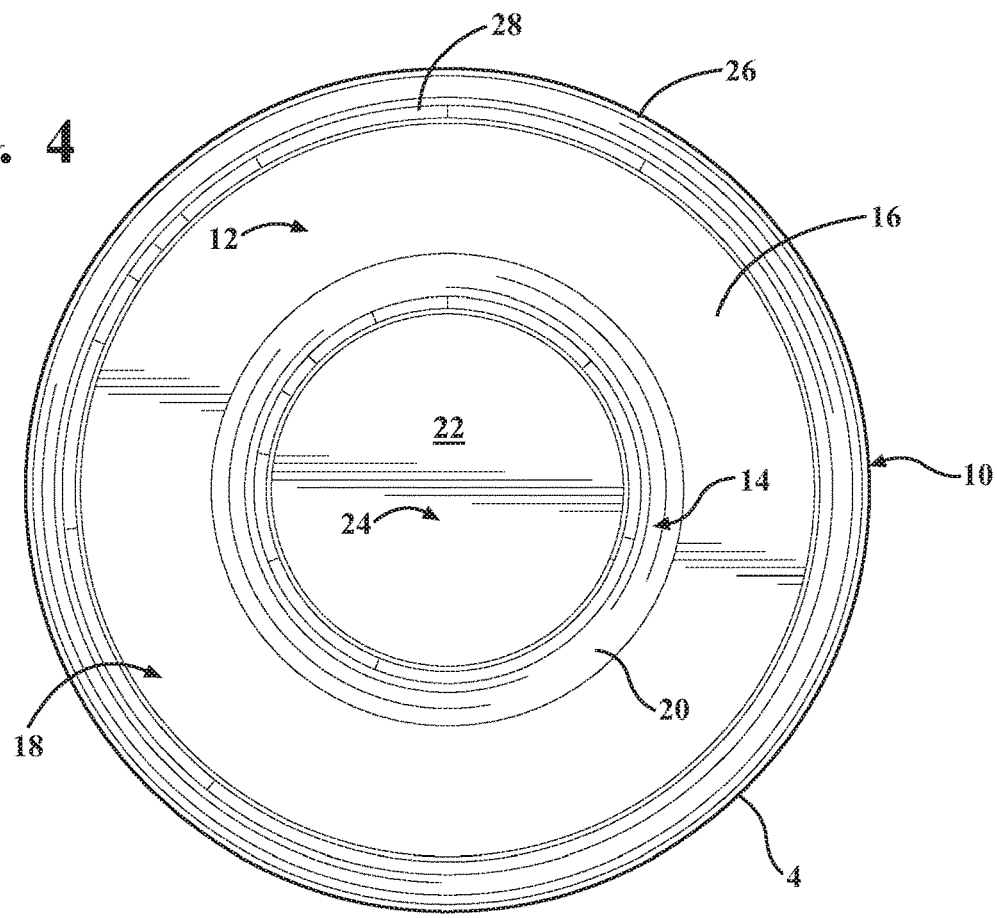
Figure 5:
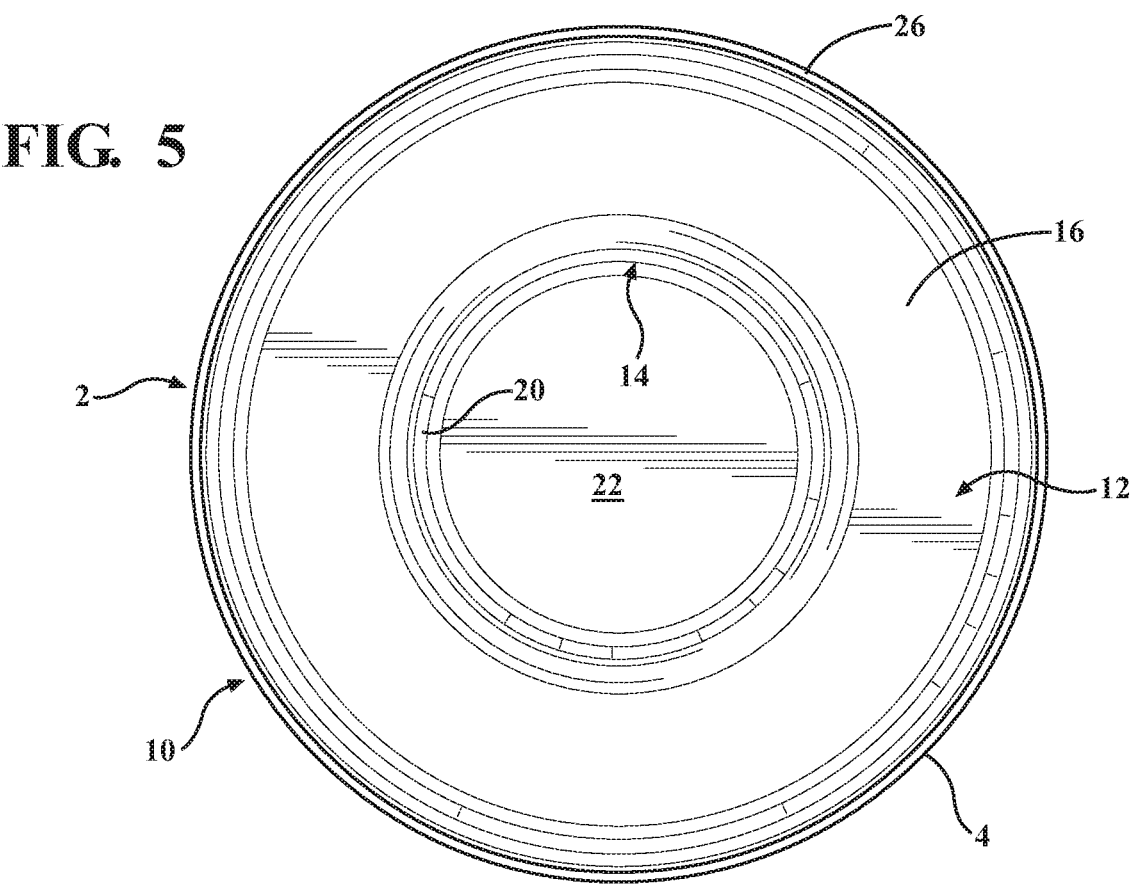
Figure 6:
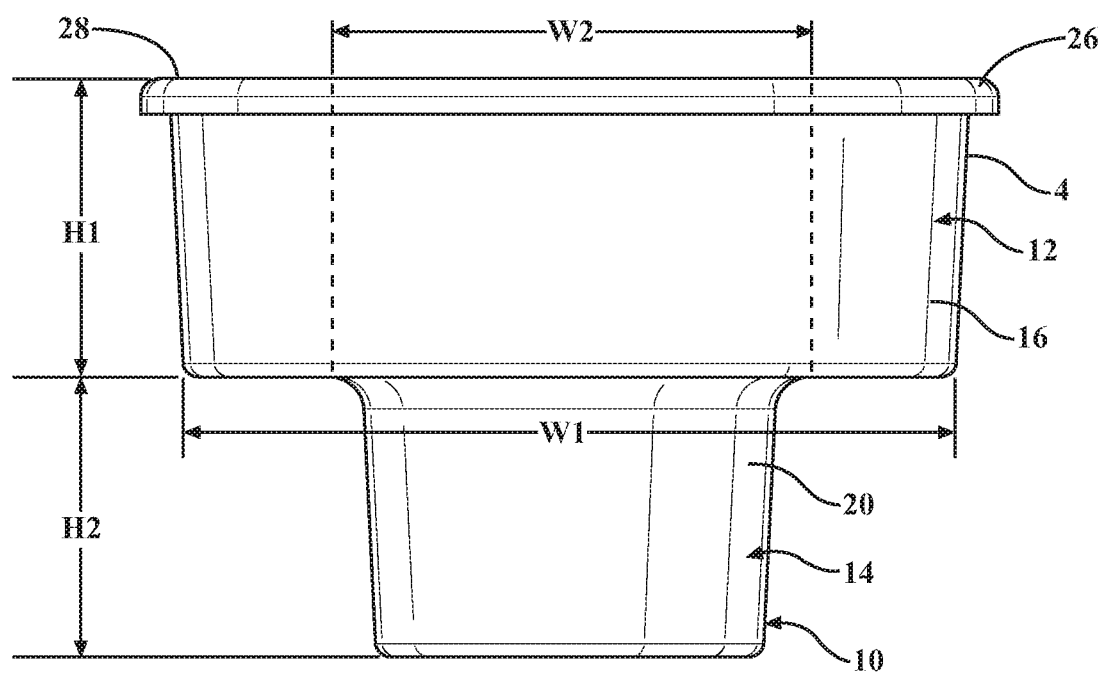
Figure 7:
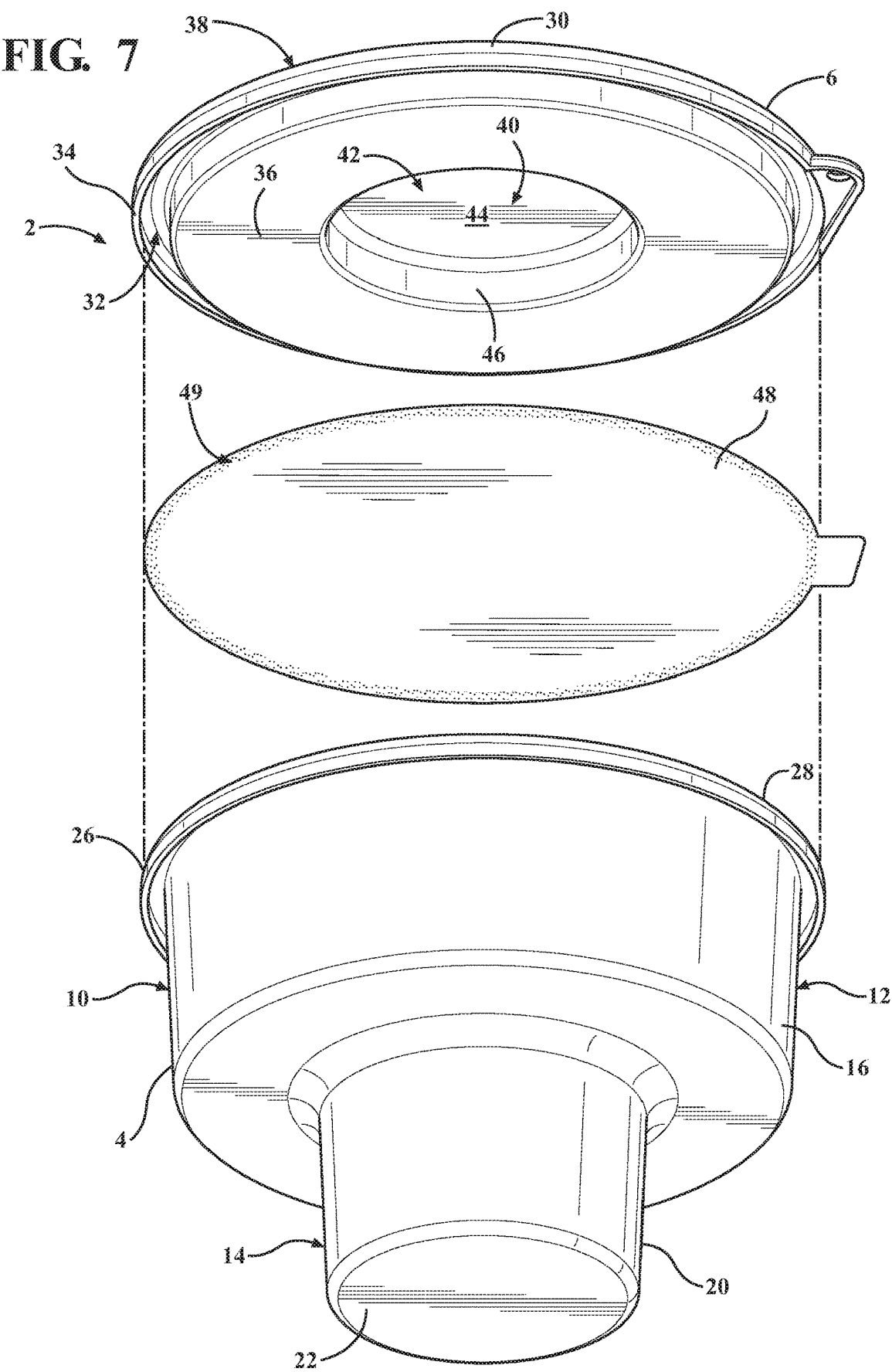
Figure 8:
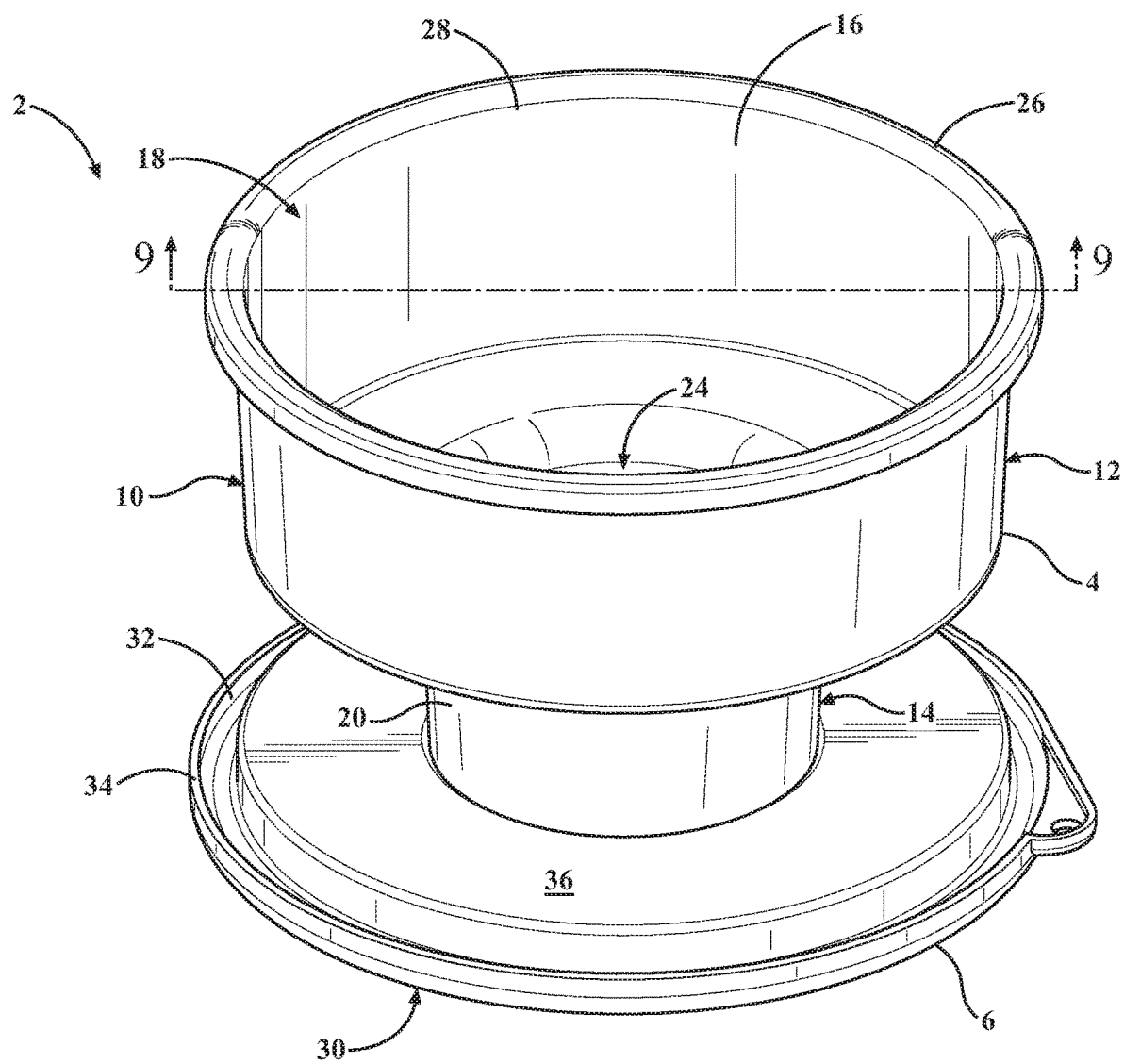
Figure 9:
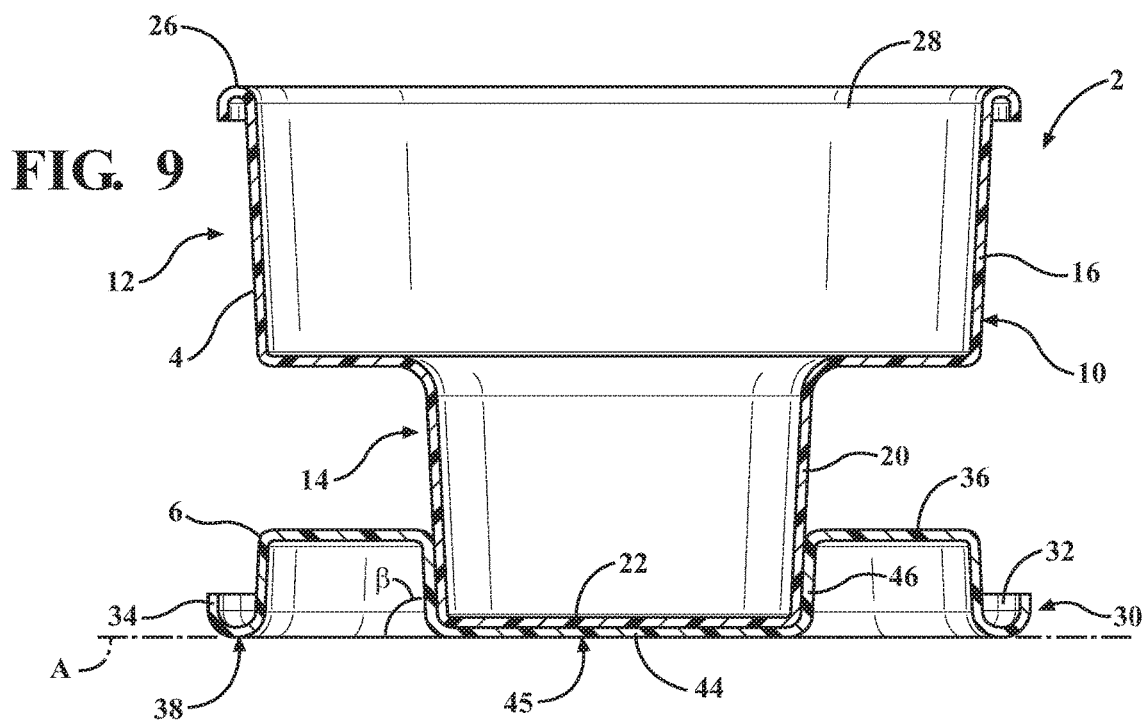
Figure 10:
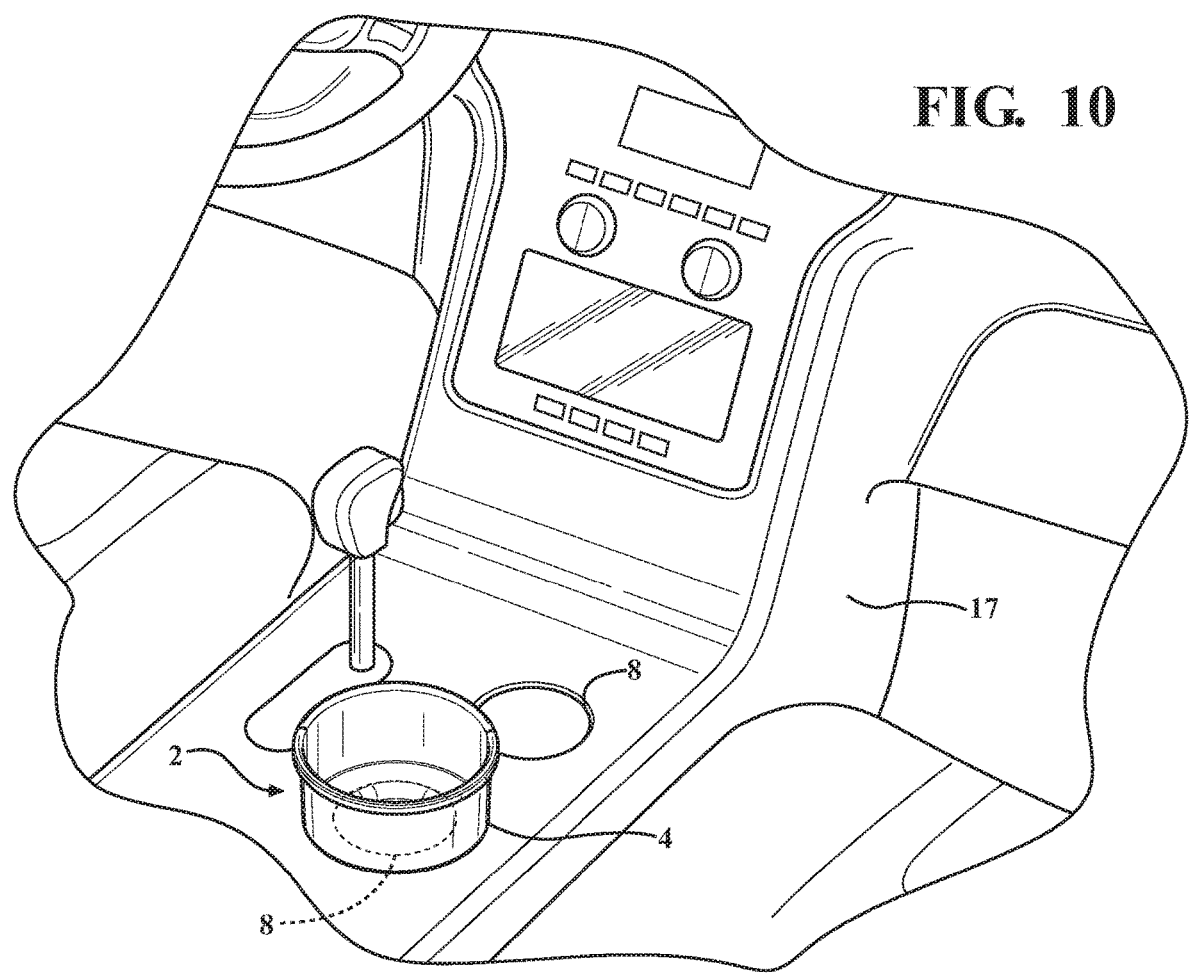
Figure 11:
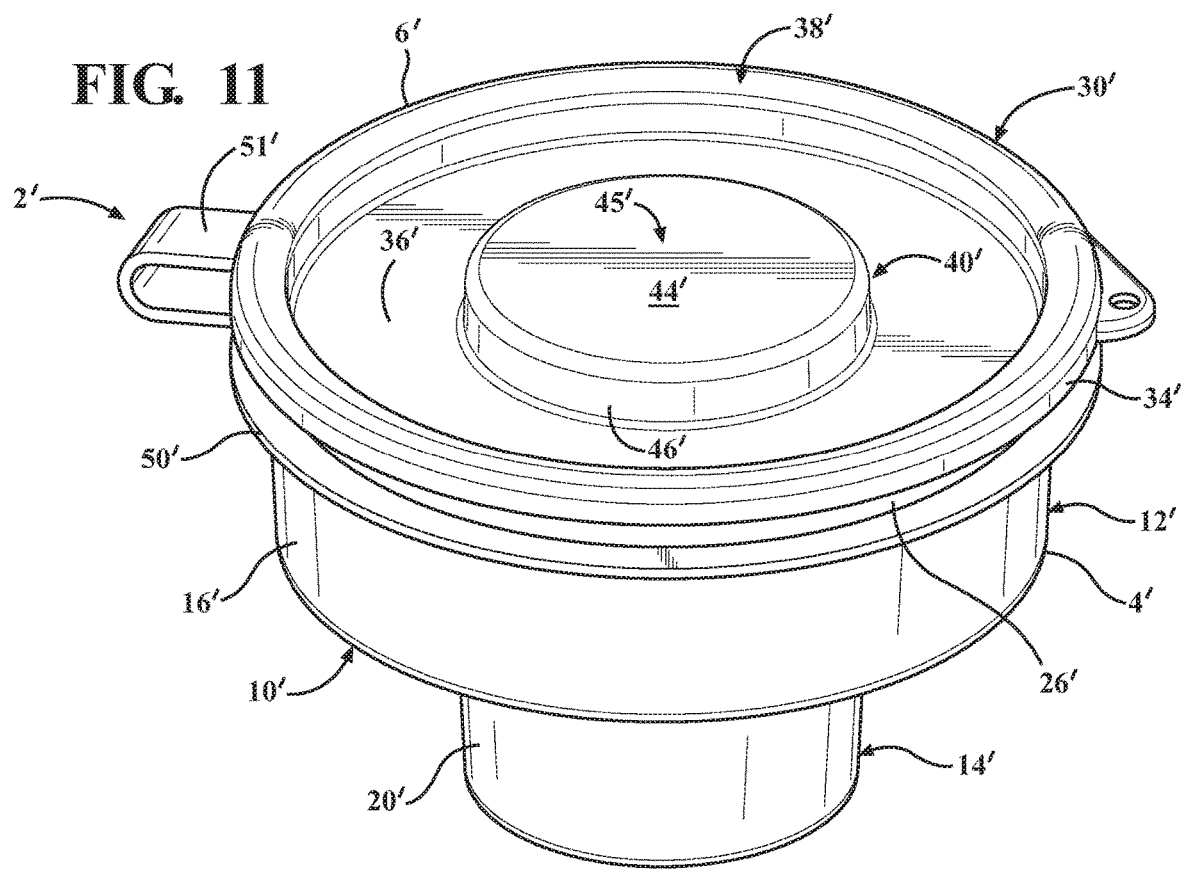
Figure 12:
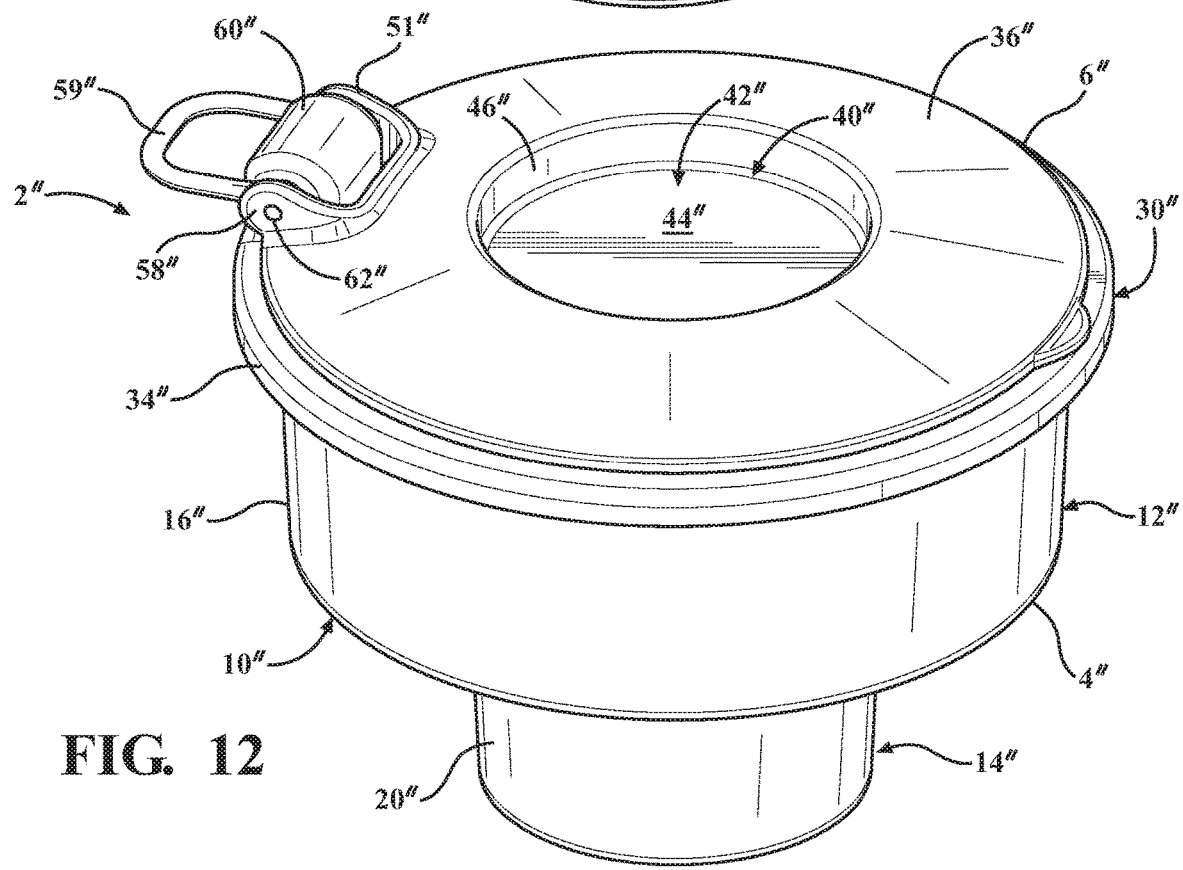
Figure 13:
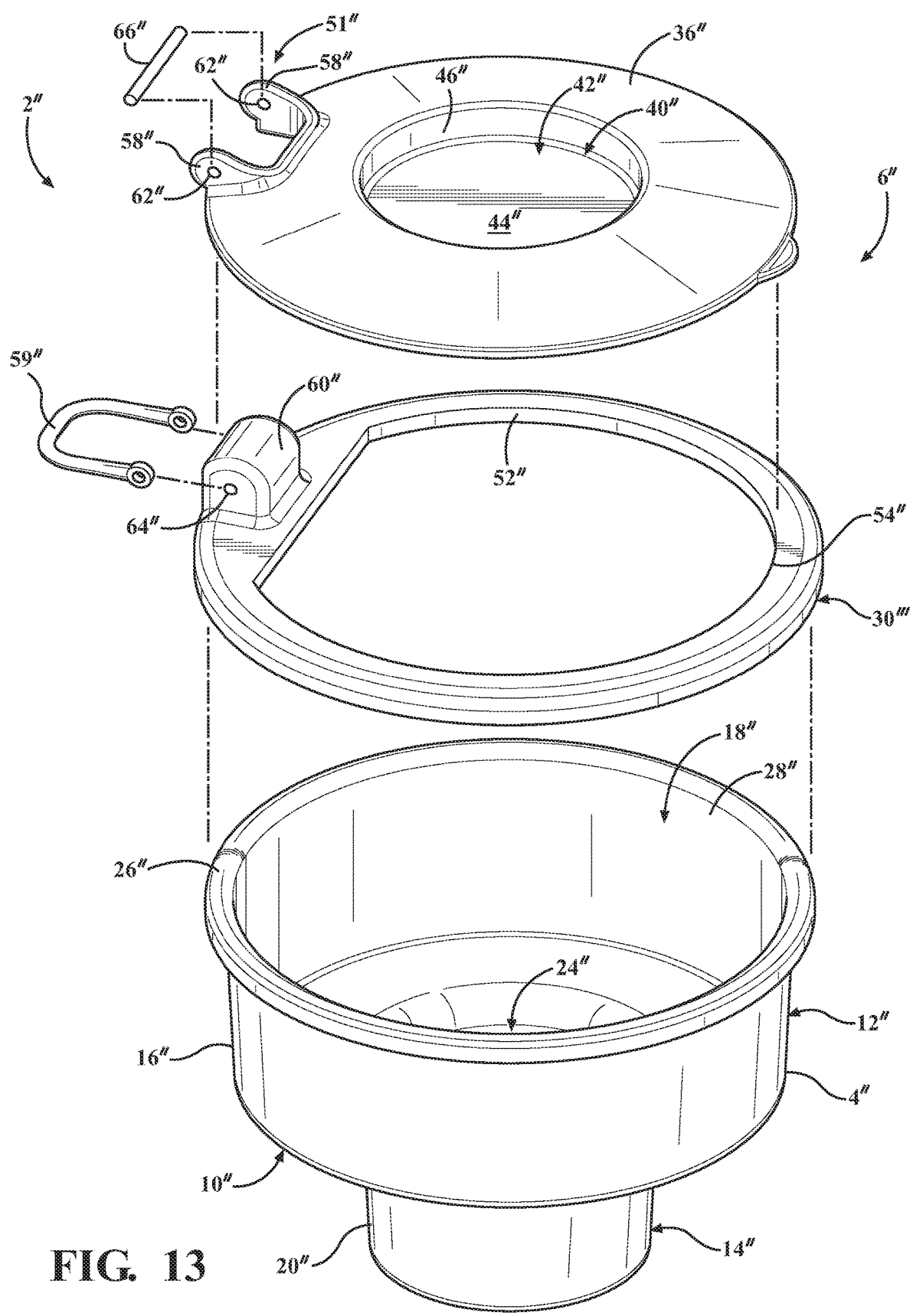
Figure 14:
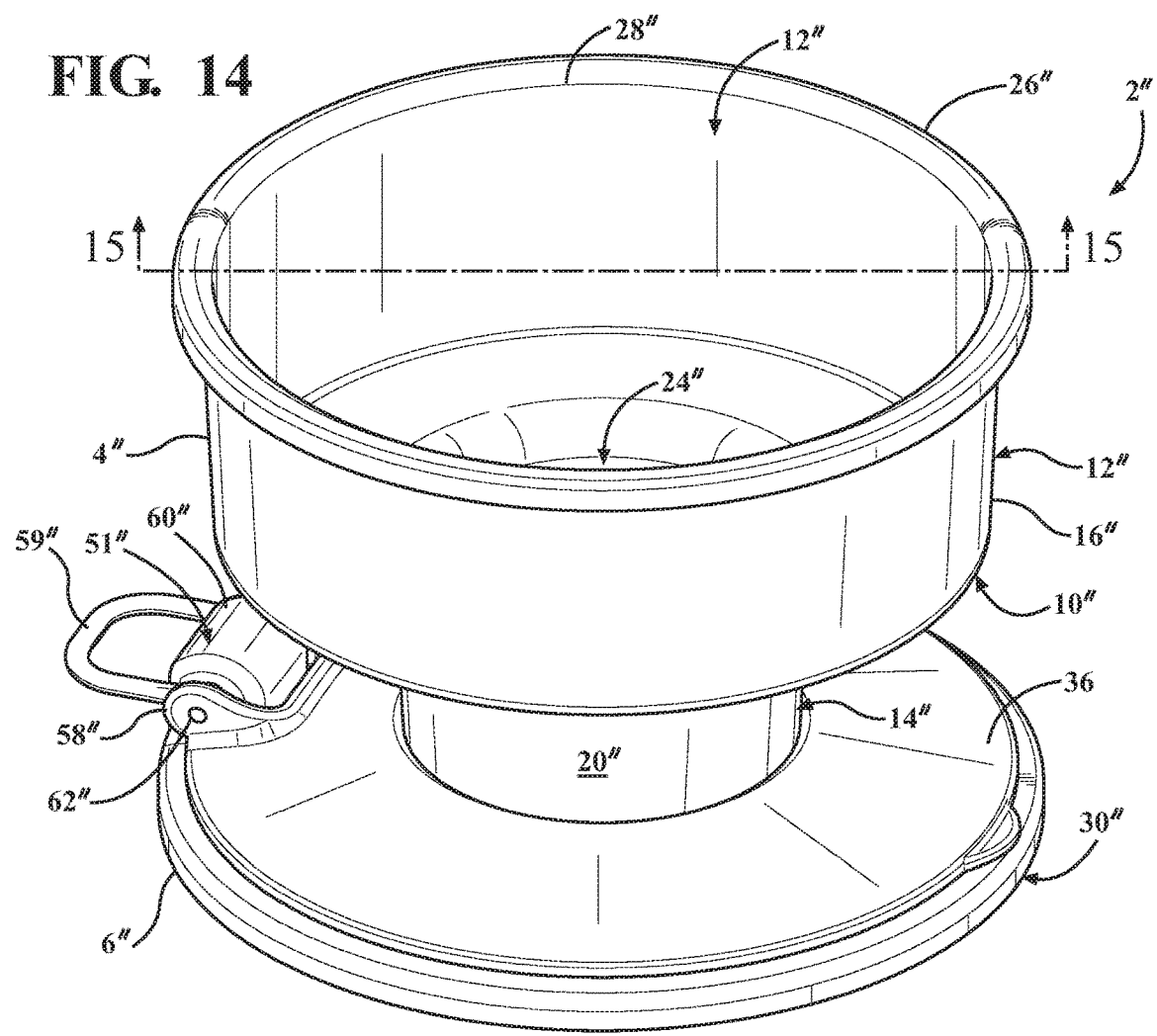
Figure 15:
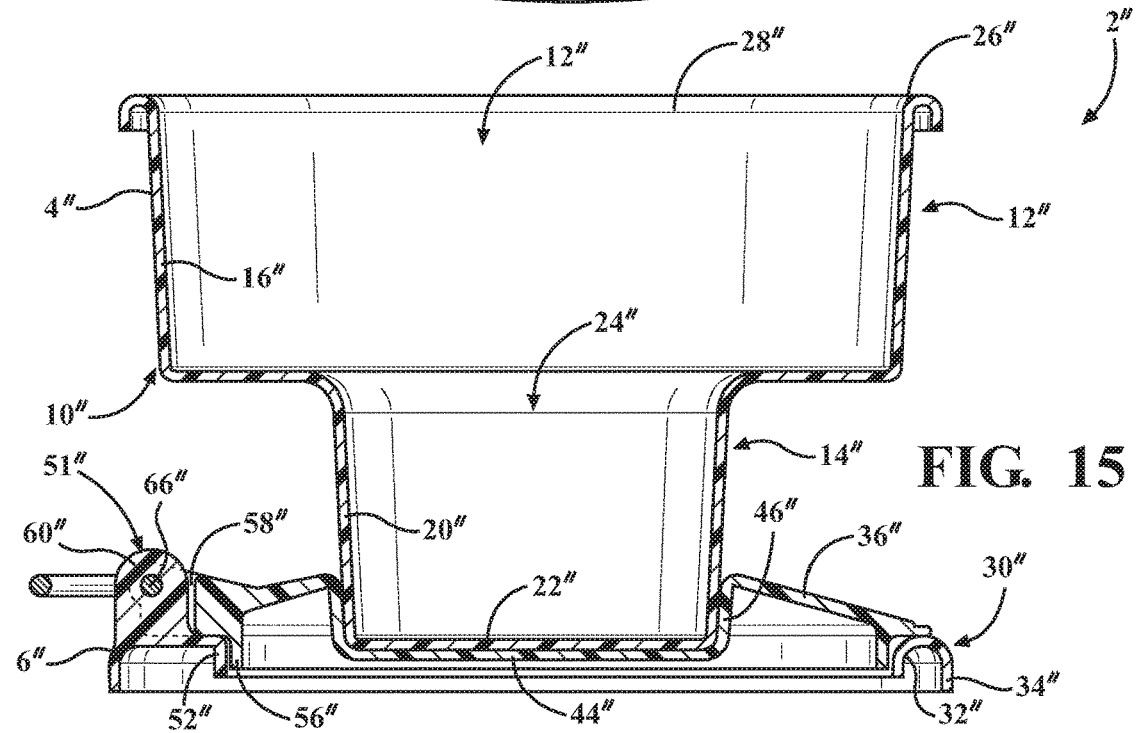
Figure 16:
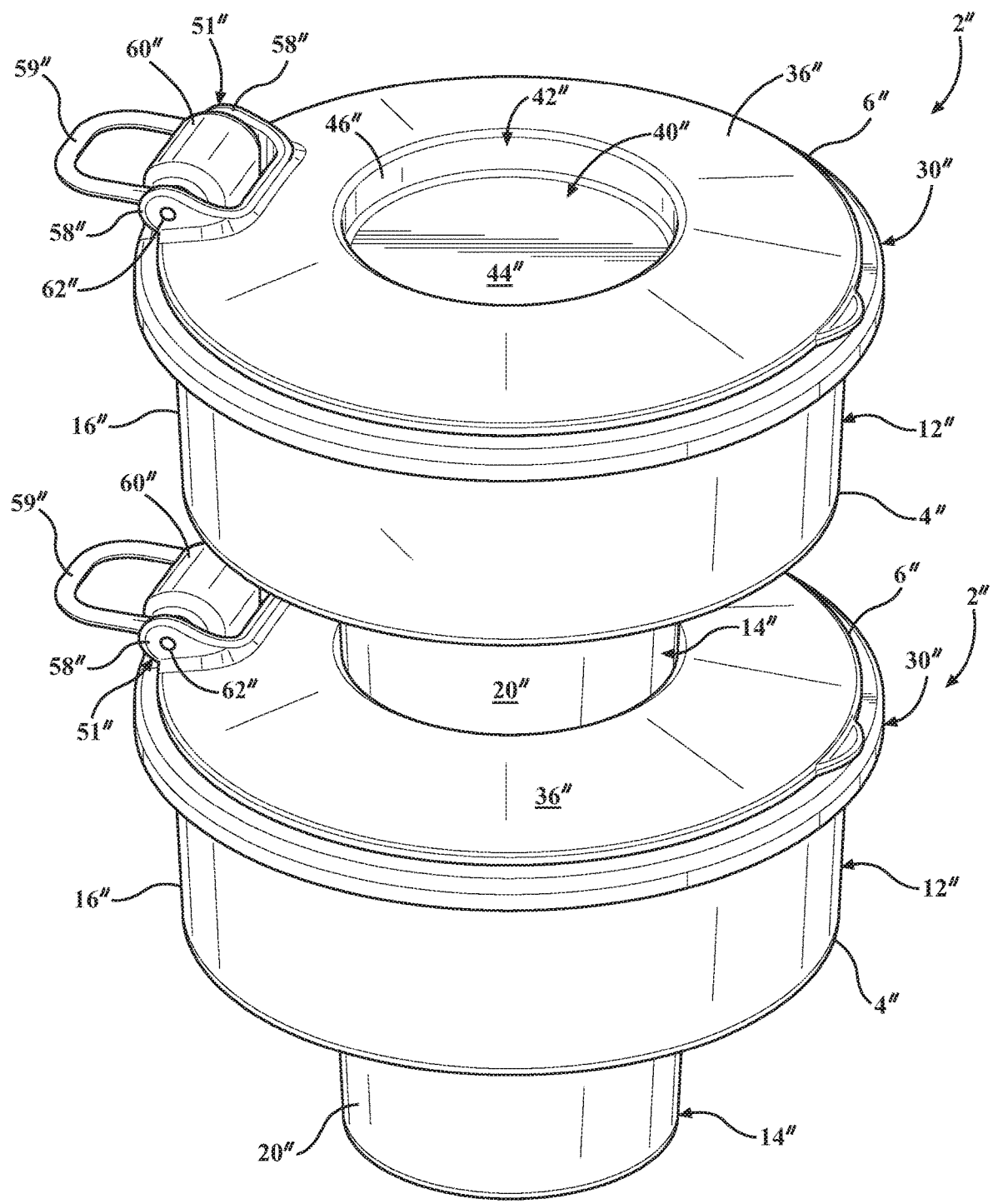
Figure 17:
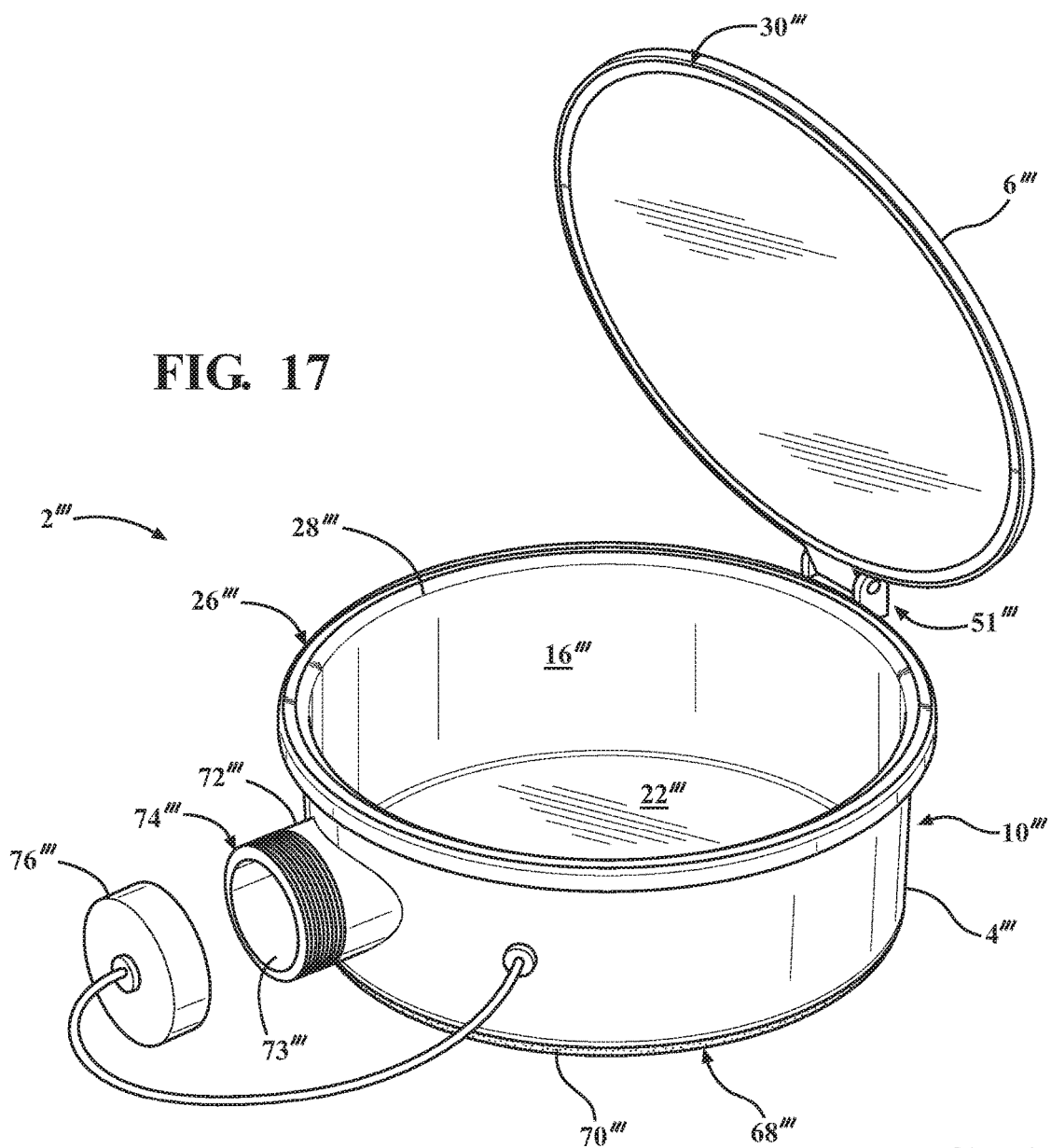
Figure 18:
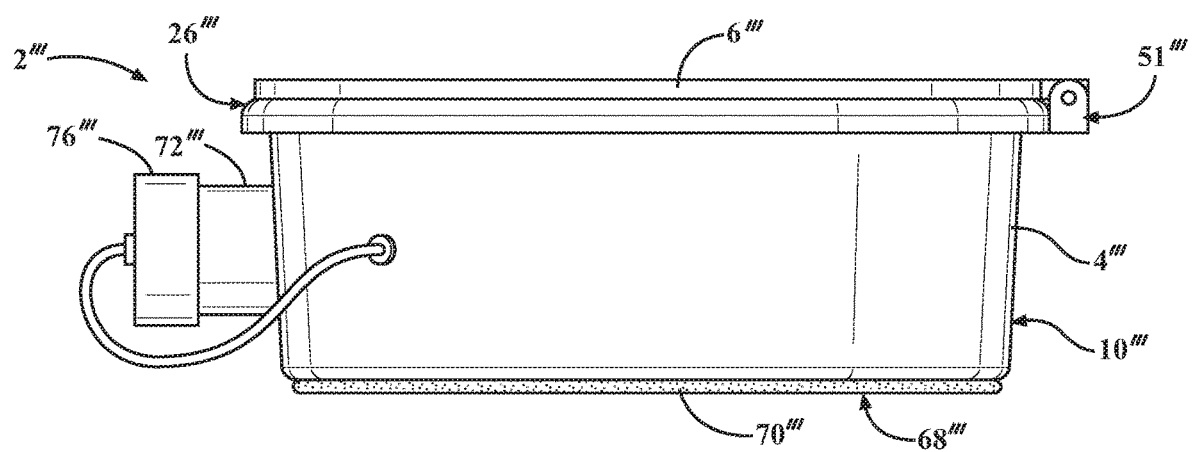

FIG. 3 a bottom perspective view of the bowl shown in FIG. 1;

FIG. 4 is a top plan view of the bowl shown in FIG. 1;

FIG. 5 is a bottom plan view of the bowl shown in FIG. 1;

FIG. 6 is a side elevational view of the bowl shown in FIG. 1;

FIG. 7 is an exploded, bottom perspective view of the bowl assembly shown in FIG. 1, and further showing an optional peel-away film that may be disposed between the lid and the bowl of the bowl assembly;

FIG. 8 is a top perspective view of the bowl assembly shown in FIG. 1, the bowl assembly depicted with the lid and the bowl in a second configuration, with the lid disposed on a bottom of the bowl and supporting the bowl on a floor or ground surface;

FIG. 9 is a cross-sectional, side elevational view of the bowl assembly taken at section line 9-9 in FIG. 8;

FIG. 10 is a partial top perspective view of an interior of a vehicle having the bowl assembly shown in FIG. 1, the bowl assembly disposed in a cup holder of the vehicle;

FIG. 11 is a top perspective view of the bowl assembly according to another embodiment of the present disclosure;

FIG. 12 is a top perspective view of the bowl assembly according to a further embodiment in the present disclosure, the bowl assembly depicted with a lid and a bowl in a first configuration, with the lid disposed on a top of the bowl;

FIG. 13 is an exploded, top perspective view of the bowl assembly shown in FIG. 12;

FIG. 14 is a top perspective view of the bowl assembly shown in FIG. 12, the bowl assembly depicted with the lid and the bowl in a second configuration, with the lid disposed on a bottom of the bowl;

FIG. 15 is a cross-sectional, side elevational view of the bowl assembly taken at section line 15-15 in FIG. 14;

FIG. 16 is a top perspective view of a stack of the bowl assembly shown in FIG. 12, and depicting a nested arrangement of multiple bowl assemblies;

FIG. 17 is a top perspective view of the bowl assembly according to yet another embodiment of the present disclosure, and showing the lid in an opened position; and FIG. 18 is a side elevational view of the bowl assembly shown in FIG. 17, and showing the lid in a closed position.

DETAILED DESCRIPTION

The following detailed description and appended drawings describe and illustrate various embodiments of the invention. The description and drawings serve to enable one skilled in the art to make and use the invention and are not intended to limit the scope of the invention in any manner.

In one embodiment, shown in FIGS. 1-10, a bowl assembly 2 has a bowl 4 and a lid 6. The bowl assembly 2 is adapted to store contents such as water or food for a pet. Specifically, the bowl 4 is configured to contain contents such as pet food or drinking water, while the lid 6 is configured to selectively seal the contents within the bowl 4 where in a first configuration. The lid 6 is also configured to selectively support the bowl 4 where in a second configuration. Each of the first configuration and the second configuration are further described hereinbelow.

As shown in FIG. 10, the bowl assembly 2 is especially adapted to support the contents of the bowl 4 while in a cup holder 8. As shown in FIG. 9, the lid 6 of the bowl assembly 2 is also configured to stabilize the bowl 4 when the bowl 4 and the lid 6 are placed on a ground surface, identified by plane A. It should be appreciated that the bowl assembly 2 is configured to stabilize the bowl 4 and militate against the spilling of the contents during feeding or water of the pet, either through the use of the cup holder 8, or by securing the bowl 4 to the lid 6 for purposes of stabilization.

In particular, the bowl assembly 2 has a hollow main body 10 with a first portion 12 and a second portion 14. The first portion 12 has a first wall 16 that forms a first cavity 18 (shown in FIG. 2) in the main body 10. The second portion 14 has a second wall 20 and a base wall 22 (shown in FIG. 3) that together define a second cavity 24 (shown in FIG. 2) in the main body 10. The first wall 16 and the second wall 20 may also be concentric, with the second wall 20 disposed radially inwardly from the first wall 16.

The first wall 16 has a lip 26 that defines a first opening 28 in the main body 10. The first opening 28 allows the pet to access the contents disposed within the main body 10. In certain embodiments, as shown in FIG. 3, each of the first wall 12, the second wall 20 and the base wall 22 may integrally formed as a single, unitary, one-piece assembly. However, multi-piece assemblies are also contemplated and considered to be within the scope of the present disclosure.

Figure 2:
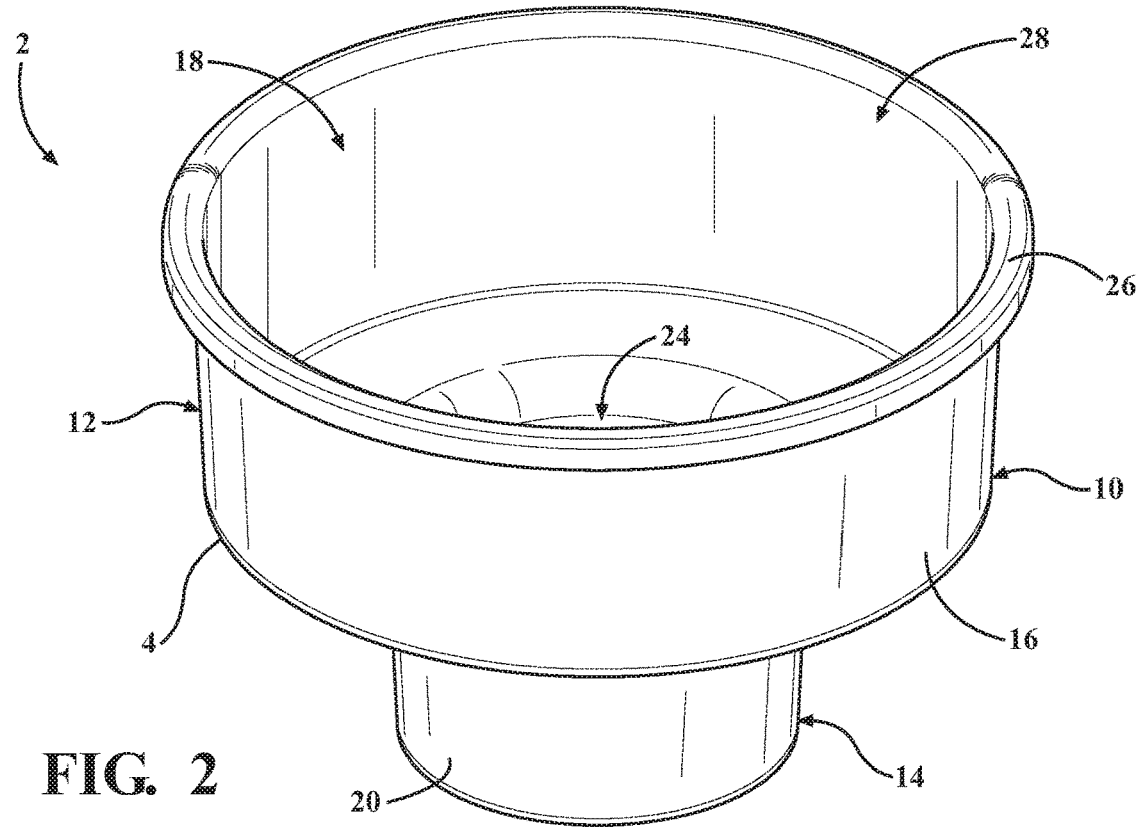
FIG. 2 is a top perspective view of a bowl of the bowl assembly shown in FIG. 1, the bowl shown without a lid.

With reference to FIGS. 2 and 6, a volume of the first cavity 18 is larger than a volume of the second cavity 24. The first portion 12, which contains the first cavity 18, may have a minimum width W1. The second portion 14, which contains the second cavity 24, may have a maximum width W2. The maximum width W2 of the second portion 14 may be smaller than the minimum width W1 of the first portion 12. It should be understood that the smaller width W2 of the second portion 14 allows the second portion 14 to be placed within the cup holder 8, while the larger width W1 of the first portion 12 optimizes the volume of first cavity 18 in the main body 10 for holding the contents such as the food, treats, or drinking water for the pet.

It should be appreciated that the first wall 16 of the first portion 12 may be of both a height H1 and the width W1 in order to maximize the volume of the first cavity 18, while allowing the pet to access all the contents, including the contents within the second cavity 24, within the main body 10. It may otherwise be especially difficult for the pet to retrieve the contents in the second cavity 24, which is both disposed at a bottom of the bowl 4 and may have a smaller volume than the first cavity 18. It should also be appreciated that if the minimum width of the first portion 12 were too small, the pet will not be able to access the contents of the main body 10. Consequentially, the first portion 12 of the main body 10 needs to be of the width W1 and the height H1 in order to allow the pet sufficient access to the contents within the first and second portions 12, 14, while also maximizing an overall amount of the contents that may be disposed in the bowl 4.

One of the most common household pets is a dog. A minimum average length of a dog snout, measured from a nasion of the dog's nose to a tip of the nose, is about two (2) inches. A maximum average length of the dog's snout is about six (6) inches. A minimum average height of the dog's snout, measured from the top of the nose to the bottom of the dog's jaw, is about two (2) inches. A maximum average height of the dog's snout is about five (5) inches.

In view of these common dimensions associated with dogs, the bowl assembly 2 may be adapted specifically to accommodate the average snout sizes of dogs. As non-limiting examples, as shown in FIG. 6, the height H1 of the first portion 12 may be between about one (1) inch and about three (3) inches, and most particularly about two (2) inches. Similarly, the minimum width W1 of the first portion 12 may be between about 3.25 inches and about 7.25 inches, and most particularly about 5.25 inches.

Additionally, as shown in FIGS. 6 and 10, while the first portion 12 of the bowl assembly 2 may be adapted for the pet to access the main body 10, the second portion 14 of the bowl assembly 2 may be configured to fit within the cup holder 8 of a vehicle 17. For example, the industry standard diameter for the cup holder 8 is about 2.675 inches, and the depth of an average cup holder 8 is about 2.25 inches. In a non-limiting example, the height H2 of the second portion 14 may be between about one (1) inch and about three (3) inches, and most particularly about two (2) inches. Similarly, the maximum width W2 of the second portion 14 may be less than 2.675 inches, and most particularly about 2.6 inches. It should be appreciated that the maximum width W2 may be selected in order to provide a secure interference or friction fit with the conventional sized cup holder 8. One of ordinary skill in the art may also select other suitable dimensions H1, H2, W1, and W2 for the bowl assembly 2 within the scope of the present disclosure.

Many common cup holders 8 are recesses that are generally frustoconical in shape. Thus, in certain embodiments, and as shown in FIG. 6, the second portion 14 of the bowl assembly 2 may have a corresponding frustoconical shape. It should be appreciated that this shape permits for a more secure holding of the bowl assembly 2, while also facilitating an insertion of the second portion 14 of the bowl assembly 2 into common types of the cup holder 8. However, it should be appreciated that the second portion 14 may be any other suitable shape chosen by one skilled in the art, as desired.

In a further example, an outer surface of the second portion 14 of the main body 10 may also have a roughened surface texture (not shown), for example, a ribbed exterior surface. The roughened surface texture may facilitate the interference fit between the second portion 14 and the cup holder 8, thereby increasing stability of the bowl 4 where placed in the cup holder 8 of the vehicle 17.

With reference to FIGS. 7-9, the lid 6 of the bowl assembly 2 may also have a collar 30. The collar 30 is adapted to seal the first opening 28 in the main body 10. For example, a channel 32 may be formed within the collar 30. The channel 32 is configured to receive the lip 26 of the bowl 4 that surrounds the first opening 28. Where the lid 6 is disposed on the bowl 4, as shown in FIG. 1, the lip 26 of the bowl 4 is received by the channel 32, while a flange 34 of the collar 30 envelops or covers the lip 26, thereby forming a fluid tight seal. Although the lid 6 is shown in FIG. 7 having the collar 30 and the channel 32, it should be appreciated that the lid 6 may be secured to the bowl 4 through any other suitable means chosen by a skilled artisan, such as a threads, magnets, hinges, and latches, as non-limiting examples.

As shown in FIGS. 1 and 7, the collar 30 further surrounds an intermediate portion 36 of the lid 6. The intermediate portion 36 may be vertically spaced apart from an outer surface 38 of the collar 30. In certain embodiments, where the bowl assembly 2 is oriented in an upright position and the lid 6 is connected to the bowl 4 assembly 2, the intermediate portion 36 is adapted to be vertically below the lip 26 of the bowl 4.

With further reference to FIG. 7, a hollow receiver portion 40 may be formed within the intermediate portion 36. The hollow receiver portion 40 has a recess 42 defined by a support wall 44 and a stabilizing wall 46. The stabilizing wall 46 may be oriented transverse to the support wall 44. The support wall 44 may be oriented approximately parallel with the outer surface 38 of the collar 30. For example, as shown in FIG. 9, the outer surface 38 of the collar 30 and an exterior surface 45 of the support wall 44 may each be disposed on the plane A, where plane A may represent a ground or floor surface. It should be appreciated that the stabilizing wall 46 of the hollow receiver portion 40 may also be oriented at an angle β relative to the plane A. In particular examples, the angle β is less than 90 degrees, and more particularly about 85 degrees, in order to accommodate the second wall 20 where the second portion 14 is frustoconical. Other suitable angles β may also be employed, as desired.

In operation, and with renewed reference to FIGS. 8 and 9, the lid 6 may be employed not only in the first configuration as a closure for the first portion 12, but alternatively in the second configuration to brace and stabilize the second portion 14 of bowl 4. As shown in FIGS. 8 and 9, the hollow receiver portion 40 is open to a bottom side of the lid 6. Where in the second configuration, the lid 6 is removed from the main body 10 of the bowl 4 and is inverted or otherwise oriented so that the outer surface 38 of the collar 30 and the exterior surface 45 of the support wall 44 are abutting the ground or floor surface. For example, the user may grab the lid 6 by a grip (shown in FIG. 1) disposed on a peripheral edge of the lid 6 in order to remove it from atop the bowl 4 and invert the lid 6. The second portion 14 of the bowl 4 is then inserted into the hollow receiver portion 40 of the lid 6 until both the second wall 20 of the second portion 14 abuts the stabilizing wall 46 of the lid 6, and the base wall 22 of the second portion 20 abuts the support wall 44 of the lid 6. It should be understood that the second portion 14 of the bowl 4 may form a friction fit with the hollow receiver portion 40 of the lid 6, which results in a stabilization of the bowl 4 atop the lid 6.

In certain embodiments, the exterior surface 45 of the support wall 44 may have texturing, ridges or bumps (not shown) formed thereon, or an additional gripping material such as rubber (not shown) disposed thereon, to militate against a sliding of the bowl 4 on the ground or floor surface. The exterior surface 45 may likewise be configured to minimize and opportunity for damage to the ground surface as the pet uses the bowl assembly 2.

It should also be appreciated that, where the lid 6 is in the second configuration, the intermediate portion 36 of the lid 6 is vertically spaced apart from the ground or floor surface. The intermediate portion 36 spaced apart from the ground surface militates against debris from entering the bowl 4 where the lid 6 is subsequently secured to the lip 26 in the first configuration. A skilled artisan will understand that this ensures that the contents of the bowl 2 remain untainted or uncontaminated following repeated use of the bowl 4 by the pet.

In a further embodiment, at least one of the stabilizing wall 46 of the hollow receiver portion 40 and an outer surface of the second wall 20 of the second portion 14 may have a roughened or textured surface (not shown). For example, the roughened or textured surface may be ribbed. The roughened or textured surface may facilitate a friction fit between the second portion 14 of the bowl 4 and the hollow receiver portion 40, thereby optimizing a stability of the bowl 4 where removably attached to the lid 6 in the second configuration.

As shown in FIG. 7, an optional peel-away film 48 may also be attached to the lip 26 of the bowl 4. For example, the peel-away film 48 may be attached to the lid 6 using an adhesive 49. The adhesive 49 may only be disposed adjacent a perimeter of the peel away film 48. The peel-away film 48 may provide an additional fluid-impermeable barrier to ensure freshness of the contents stored within the bowl 4. The film 48 when undisturbed may also allow the user to know that the contents of the bowl 4 were not tampered with before the bowl 4 was purchased. For example, the peel-away film 48 may be formed from a thin plastic sheet or a wax paper. However, any other flexible material may also be chosen by one skilled in the art for the peel-away film 48, as desired.

In particular embodiments, the bowl 4 may be purchased prefilled with food or water for the pet. In operation, the user may purchase a prefilled bowl assembly 2 in the first configuration with the lid 6 disposed on top of the bowl 4, and then subsequently remove the lid 6 and, where present, the peel-away film 48. Once the lid 6 is removed, the user may place the second portion 14 of the main body 10 in the cup holder 8 of the vehicle 17, where the pet is inside the vehicle 17.

Alternatively, once the lid 6 is removed from the top of the bowl 4, the second portion 14 may be secured within the hollow receiver portion 40 of the lid 6 in the second configuration. This stabilizes the bowl 4 where placed on the ground or floor surface as described hereinabove. Where the pet is finished consuming the contents of the bowl 4, the user may secure the collar 30 of the lid 6 to the lip 26 of the bowl 4 to reseal the contents of the bowl assembly 2 in the first configuration, for later use.

In another embodiment, as shown in FIG. 11, the lid 6' of the bowl assembly 2' may be removably attached to the bowl 4' by a band 50'. In FIG. 11, like or related structure to that shown in FIGS. 1-10 is identified with the same reference number and a prime symbol (') for purpose of clarity.

As shown in FIG. 11, the band 50' is configured to extend around an outer perimeter of the first portion 12' beneath the lip 26' of the bowl 4'. The band 50' thereby removably secures the lid 6' to the main body 10' of the bowl 4'. For example, the band 50' may be stretchable and formed from an elastomeric material such as rubber or silicone that allows the band 50' to be stretched over top of the lip 26'. Additionally, the lid 6' may be connected to the band 50' by a hinge 51', for example a living hinge that is integrally formed with both the band 50' and the lid 6'. Other suitable materials and types of hinge 51' may also employed, as desired.

In a further embodiment, as shown in FIGS. 12-16, the lid 6" may be hingedly attached to the bowl 4" of the bowl assembly 2" in the first configuration with the lid 6" disposed atop the bowl 4". In FIGS. 12-16, like or related structure to that shown in FIGS. 1-11 is identified with the same reference number and a double prime symbol (") for purpose of clarity.

In particular, as shown in FIGS. 12-16, the intermediate portion 36" of the lid 6" may be hingedly connected to the collar 30" by the hinge 51". For example, the intermediate portion 36" may have a pair of projections 58" that are configured to connect with at least one protrusion 60" on the collar 30" of the lid 6" and which, together with a hinge pin 66", define the hinge 51". In this manner, the intermediate portion 36" of the lid 6" is configured to be used as a hinged "cap" on the lid 6" that is configured to be opened and closed to selectively provide access to the contents of the bowl assembly 2", all while the collar 30" of the lid 6" otherwise remains attached to the top of the bowl 4"

The lid 6" may also have a loop 59" for carrying the bowl assembly 2". The loop 59" may be attached to the collar 30" of the lid 6", for example. The loop 59" is adapted to connect to a carabiner clip (not shown), for example, for ease in transport of the bowl assembly 2" on a belt or strap of a backpack or luggage. The loop 59" may be connected to both the projections 58" of the intermediate portion 36" and the protrusion 60'" on the collar 30' via the hinge pin 66". Other suitable means for connecting the loop 59" to the lid 6" may also be employed, as desired.

With reference to FIG. 13, the intermediate portion 36" of the lid 6" may be moved from an opened position, where the contents of the bowl 4" may be accessed by the pet, to a closed position, where the bowl 4" is sealed. For example, the collar 30" may have a rim 52" that defines a central aperture 54" in the lid 6", which is selectively accessed by moving the intermediate portion 36" to the opened position. The intermediate portion 36" is adapted to selectively seal the central aperture 54" of the collar 30" where the intermediate portion 36" is moved to the closed position.

Referring now to FIG. 15, the intermediate portion 36" may have a ledge 56" that is oriented generally parallel with an outer surface of the rim 52" of the collar 30" where the intermediate portion 36" is in the closed position. It should be appreciated that the outer surface of the rim 52" forms a hard stop for the intermediate portion 36" where in the closed position. In particular, the ledge 56" is configured to abut the rim 52" where the intermediate portion 36" has been closed. In certain embodiments, the ledge 56" may further be surrounded by an elastomeric gasket (not shown) to form a fluid tight seal where the intermediate portion 36" is moved to the closed position.

It should be understood that the hinge 51" may be defined by both the protrusion 60" disposed on the collar 30" and the cooperating pair of projections 58" disposed on the intermediate portion 36" of the lid 6", as described hereinabove. In particular, as shown in FIGS. 13-14, each of the projections 58" may have a first hole 62" formed therethrough, and the protrusion 60" may have a second hole 64" disposed therethrough. The hinge pin 66" may be inserted through both the first and second holes 62", 64" of the projections 58" and the protrusion 60". The hinge pin 66" thereby hingedly connects the intermediate portion 36" to the collar 30".

Advantageously, the hinge 51" of the cap-like intermediate portion 36" allows the pet to access the contents of main body 10" without fully removing the lid 6" from the bowl 4". It should be appreciated that a skilled artisan may use any other suitable means for hingedly connecting the lid 6" to the main body 10" of the bowl 4", including but not limited to a living hinge, a bifold hinge, a butt hinge, case hinges, or a spring-loaded hinge, as desired.

As shown in FIGS. 14-15, the lid 6" may also be employed in the second configuration to stabilize the bowl 4". For example, the lid 6" may be removed entirely from the first portion 12" of the bowl 4", where it is disposed in the first configuration as shown in FIG. 12, and placed on a ground or floor surface in the second configuration to support and stabilize the bowl 4", as shown in FIGS. 14-15.

It should be appreciated that, in contrast to the lids 6, 6' shown in FIGS. 1-11, the lid 6" shown in FIGS. 12-16 does not need to be inverted when placed in the second configuration. The hollow receiver portion 40" is instead open to a top side of the lid 6". Also, in order to further militate against debris from the ground or floor surface sticking to the lid 6" and falling into the bowl 4" when the lid 6" is returned to the first configuration, the intermediate portion 36" may have domed shape.

With particular reference to FIG. 15, the domed shape of the intermediate portion 36" in turn causes an interior surface of the lid 6" to be spaced apart from and above the ground or floor surface where the lid 6" has been placed on the ground or floor surface. This spacing of the interior surface apart from the ground or floor surface in the second configuration militates against the debris sticking to the inside of the lid 6" where placed on the ground or floor surface, and falling into the bowl 4" where the lid 6" is subsequently reattached in the first configuration. It should also be appreciated the support wall 44" is further spaced apart from the ground or floor surface where the lid 6" is inverted and in the second configuration on the ground or floor surface, thereby ensuring that the support wall 44" also does not touch the ground or floor surface while supporting the bowl 4".

Additionally, as shown in FIGS. 13-16, the hollow receiver portion 40" of the lid 6 is disposed within the dome-shaped portion of the intermediate portion 36". The support wall 44" of the hollow receiver portion 40" may be oriented roughly parallel to the lip 26" of the bowl 4" where the collar 30" of the lid 6" is attached to the main body 10" of the bowl 4" in the first configuration, as shown in FIG. 12.

With reference to FIG. 16, the hollow receiver portion 40" of the bowl assembly 4" in the first configuration is also adapted to receive the second portion 14" of another bowl assembly 2" in a nested arrangement. It should be appreciated that the relative orientations of the support wall 44" and the stabilizing wall 46" facilitate the stackability and nesting of multiple bowl assemblies 2". For example, the support wall 44" is disposed below the intermediate portion 36", where the lid 6" is attached to the lip 26" of the main body 10" in the first configuration. This relative placement of the support wall 44" defines a recess 42" that is adapted to receive the second portion 14" of another bowl assembly 2 in the nested arrangement, as shown in FIG. 16. The stabilizing wall 46" of the lid 6" of the bowl assembly 2''' is adapted to support the second portion 14" of the another bowl assembly 2" in a substantially upright position where nested together in the stack.

It should be understood that the stackable nature of the bowl assembly 2" is particularly advantageous, as it conserves space or volume when storing multiple bowl assemblies 2", for example, on a store shelf, or during transport of multiple bowl assemblies 2", for example, on a long trip with one's pet. This is especially advantageous where the bowl assemblies 2" are also prefilled with food or water for use by the pet.

In yet another embodiment, shown in FIGS. 17-18, the bowl assembly 2''' is configured for use while walking, running, or hiking with the pet. In FIGS. 17-18, like or related structure to that shown in FIGS. 1-16 is identified with the same reference number and a triple prime symbol (''') for purpose of clarity.

As shown in FIGS. 17 and 18, the lip 26''' of the side wall 16''' may define a first opening 28''' of the bowl assembly 2'''. The first opening 28''' is formed in the bowl 4m on a side of the main body 10''' opposite the base wall 22''' of the bowl 4'''. The base wall 22''' is adapted to stabilize the main body 10''' where placed on the ground or floor surface, while the first opening 28''' allows the pet to access the cavity 18''' formed in the main body 10'''.

As with the embodiment shown in FIGS. 1-16, the lid 6''' shown in FIGS. 17 and 18 is movable between the first configuration and the second configuration. In the embodiment shown in FIGS. 17 and 18, the first configuration is a positioning of the lid 6''' of the main body 10''' to selectively cover and seal the first opening 28'''. Conversely, the second configuration is a positioning of the lid 6''' of the main body 10''' to selectively uncover and unseal the first opening 28'''. In the embodiment shown in FIGS. 17 and 18, it should be appreciated that the lid 6''' in the second configuration does not necessarily support the bowl 4''', and may instead just be removed or hingedly opened to unseal the first opening 28''', for example, as shown in FIG. 17.

In a particular embodiment, at least one of the lip 26''' of the main body 10''' and the collar 30''' of the lid 6''' may be magnetized. A magnetic attractive force between the lip 26''' and the collar 30''' may allow the user to selectively secure the lid 6''' to the rim of the opening 28'''. In other non-limiting examples, the lid 6''' may selectively seal with the main body 10''' using a friction fit, a clasp, hook-and-loop fastener, or cooperating threads on the lip 26''' and rim. However, one skilled in the art may select any other suitable mechanism to secure the lid 6''' to the main body 10''', as desired.

It should be appreciated that, in certain embodiments, there may be an additional rubber, silicone, or a pliable plastic material surrounding at least one of the lip 26''' of the opening 28''' and the rim of the lid 6''', in order to facilitate the sealing of the lid 6''' with the bowl 4'''.

In further embodiments, in order to militate against the user misplacing the lid 6''' where the lid 6''' is removed from atop the bowl 4''', the lid 6''' may be connected to the main body 10''' with a connector 51'''. The connector 51''' may be one of a hinge, a rope, a plastic strap, a cord, a chain, combinations thereof, and any other suitable connecting means selected by a skilled artisan. In a particular example, as shown in FIGS. 17-18, the connector 51''' may be the hinge 51''', which hingedly attaches the lid 6''' to the main body 10'''.

As shown in FIG. 18, the base wall 22''' of the main body 10''' may have a base surface 68". The base surface 68''' is configured to abut the ground or floor surface, and thereby stabilize the bowl assembly 2''' where placed on the ground or floor surface. For example, the base surface 68''' may be substantially planar. The base surface 68''' may further be provided with a texturing, such as bumps or ribs, to facilitate a gripping of the base surface 68''' with the ground or floor surface. The base surface 68''' may also have a gripping layer 70''' to minimize slippage of the main body 10''' and militate against the main body 10''' scratching the ground or floor surface. As non-limiting examples, the gripping layer 70''' may include a soft felt cloth or rubber that is adhered to the base surface 68''' with an adhesive. As a further example, the gripping layer 70''' may be an elastomeric coating. Other suitable materials for the gripping layer 70''' may also be employed within the scope of the present disclosure.

In a further embodiment, the main body 10''' may also have at least one clip (not shown) that permits a user to easily latch the main body 10''' onto a backpack or belt loop for easy transportation. For example, the main body 10''' may have two clips, disposed on opposite sides of the main body 10", which permit the user to attach straps to the bowl 4''' for ease in transport. The bowl assembly 2''' may also use any other suitable attachment means, such as hook-and-loop fasteners, carabiner clips, rope and knot combinations, and other suitable fastening devices, as desired.

The main body 10''' may have a nozzle 72''' with a second opening 73''' for pouring and filling purposes. The nozzle 72''' may be a hollow, cylindrical protrusion, for example. The nozzle 72''' may have a threaded outer surface 74''' that is configured to selectively coupled with a cap 76''' having a threaded interior surface. The cap 76''' may also be attached to the main body 10''' by a rope, plastic strap, or cord, as shown in FIGS. 17-18. Other means for securing the cap 76''' to the main body 10''' may also be employed within the scope of the disclosure.

In operation, the user will fill the main body 10''' of the bowl 4''' with contents such as water or food for the pet to consume. Once full, the user selectively secures the lid 6''' to seal the first opening 28''' of the main body 10'''. The user may then transport the bowl assembly 2''' and provide the pet with nourishment when necessary. To provide the nourishment, the user may remove the lid 6''' and allow the pet to access the contents inside the main body 10'''. Alternatively, the user may remove the cap 76''' on the nozzle 72''' and pour the contents into another container for the pet. Where the pet is finished consuming the contents, the user will re-attach the lid 6''' and continue with the traveling or other activity.

The bowl assembly 2, 2', 2", 2''' illustrated in FIGS. 1-18, may be manufactured of a variety of materials including plastic, rubber, silicone, STYROFOAM®, metal such as aluminum or steel, wax-coated paper or cardboard, combinations thereof, or any other suitable material chosen by a skilled artisan. The material selected may be selected to be fluid impermeable where the bowl assembly 2, 2', 2", 2''' is intended to store or hold water, for example. The bowl assembly 2, 2', 2", 2'" may also be formed from an insulating material or be vacuum jacketed in order to minimize heat transfer between the interior and the exterior of the bowl assembly 2, 2', 2", 2'". The insulating material may include a neoprene covering, for example. Additionally, although the bowl 4, 4', 4", 4'" and the lid 6, 6', 6", 6'" are shown as generally round and symmetrical in shape in each of the embodiments illustrated, a skilled artisan may select any other suitable shape for the bowl assembly 2, 2', 2", 2'", as desired.

In certain embodiments, the side wall 28, 28', 28", 28'" of the main body 10, 10', 10", 10'" of the bowl assembly 2, 2', 2", 2'" may further have an ornamental covering, or be configured to receive an insert, for expressing personal messages or advertisements (not shown).

Advantageously, the bowl assembly 2, 2', 2", 2'", is convenient to travel with, may be adapted for use in the vehicle 17, for example, as shown in FIG. 10, and is also stable where placed on a ground or floor surface for use by the pet, as shown in FIG. 9.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bowl assembly, comprising:
a bowl with a hollow main body having a first portion directly adjacent a second portion, the first portion having a first wall, the first wall having a lip that defines a first opening in the main body, the second portion having a second wall, the first portion having a minimum width and the second portion having a maximum width, the minimum width of the first portion being from about 21% to about 36% greater than the maximum width of the second portion, a height of the first portion being from about 33% to about 300% of the height of the second portion; and
a lid with a collar and an intermediate portion, the collar surrounding the intermediate portion, and a hollow receiver portion formed within the intermediate portion, the hollow receiver portion defined by a stabilizing wall and a support wall, the lid positionable between a first configuration and a second configuration, the first configuration sealing the first opening of the hollow main body and the second configuration supporting the hollow main body, wherein the hollow receiver portion is open to a bottom side of the lid, and when the lid is positioned in the second configuration the lid is inverted relative to the first configuration and the second wall of the bowl abuts the stabilizing wall of the lid in order to support the bowl,
wherein the collar has an outer surface and the support wall has an exterior surface, and the outer surface of the collar and the exterior surface of the support wall are on a same plane.

2. The bowl assembly of claim 1, further comprising a peel-away film that is removably attached to the lip of the first portion and disposed between the lip and the lid where the lid is in the first configuration.

3. The bowl assembly of claim 1, wherein the maximum width of the second portion is up to about 2.675 inches.

4. The bowl assembly of claim 1, wherein the lid has a grip that is disposed on a peripheral edge of the lid.

5. The bowl assembly of claim 1, wherein the second portion of the main body is frustoconical in shape.

6. The bowl assembly of claim 5, wherein the hollow receiver portion of the lid is frustoconical and configured to receive the second portion of the main body with an interference fit when in the second configuration.

7. The bowl assembly of claim 1, wherein the collar of the lid is configured to receive the lip of the first portion of the main body when in the first configuration.

8. The bowl assembly of claim 1, wherein the maximum width of the second portion is configured to be selectively disposable within a cup holder, and the first portion is configured to selectively abut a top surface of the cup holder.

9. A stacked combination, comprising:
a first bowl assembly and a second bowl assembly, each of the first bowl assembly and the second bowl assembly including a bowl having a hollow main body having a first portion directly adjacent a second portion, the first portion having a first wall, the first wall having a lip that defines a first opening in the main body, the second portion having a second wall, the first portion having a minimum width and the second portion having a maximum width, the minimum width of the first portion being from about 21% to about 36% greater than the maximum width of the second portion, a height of the first portion being from about 33% to about 300% of the height of the second portion, and a lid with a collar and an intermediate portion, the collar surrounding the intermediate portion, and a hollow receiver portion formed within the intermediate portion, the hollow receiver portion defined by a stabilizing wall and a support wall, the lid positionable between a first configuration and a second configuration, the first configuration sealing the first opening of the hollow main body and the second configuration supporting the hollow main body,
wherein the hollow receiver portion is open to a bottom side of the lid, and when the lid is positioned in the second configuration the lid is inverted relative to the first configuration and the second wall of the bowl abuts the stabilizing wall of the lid in order to support the bowl,
wherein the collar has an outer surface and the support wall has an exterior surface, and the outer surface of the collar and the exterior surface of the support wall are on a same plane, and
wherein the second portion of the first bowl assembly is disposed in the hollow receiver portion of the second bowl assembly in a nested arrangement.

* * * * *